Oct. 24, 1967  E. MILKERT  3,348,248
AUTOMATIC TAPPING MACHINE AND METHOD
Filed Nov. 1, 1965  2 Sheets-Sheet 1
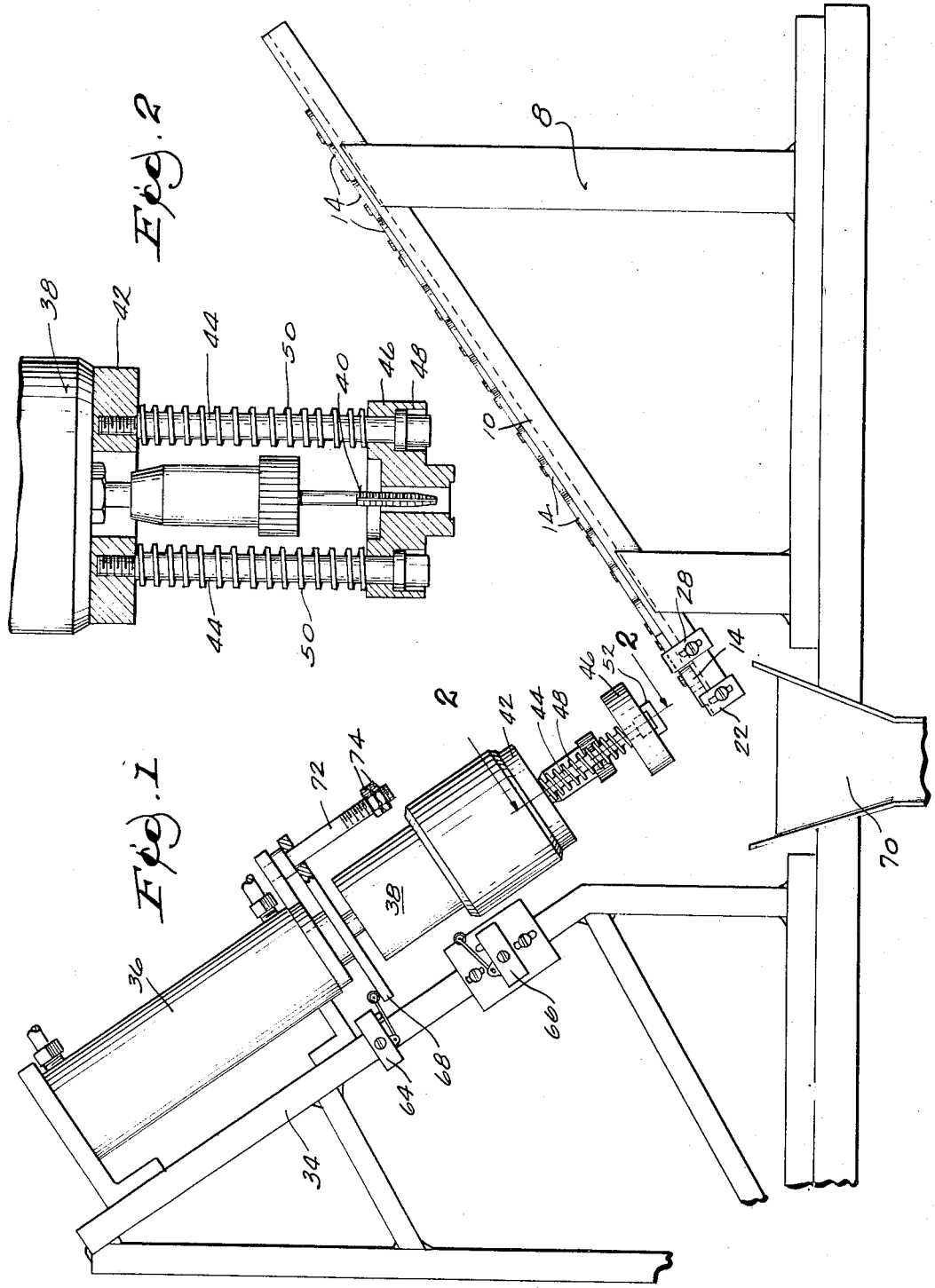
INVENTOR
EDWIN MILKERT
BY Wheeler, Wheeler & Wheeler
ATTORNEYS Oct. 24, 1967  E. MILKERT  3,348,248
AUTOMATIC TAPPING MACHINE AND METHOD
Filed Nov. 1, 1965 2 Sheets-Sheet 2
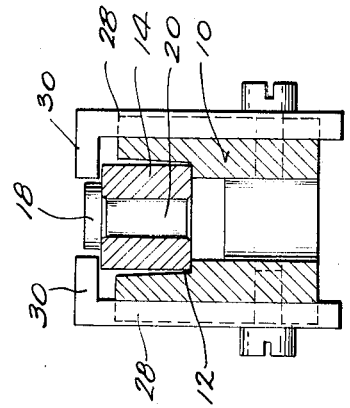
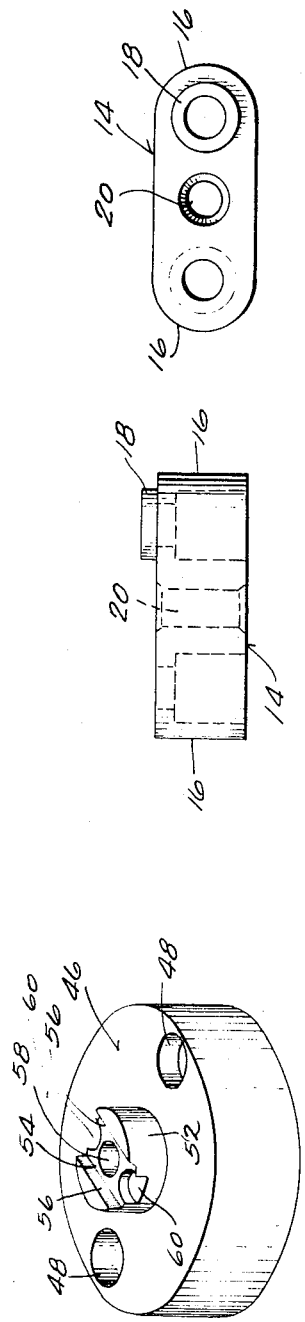
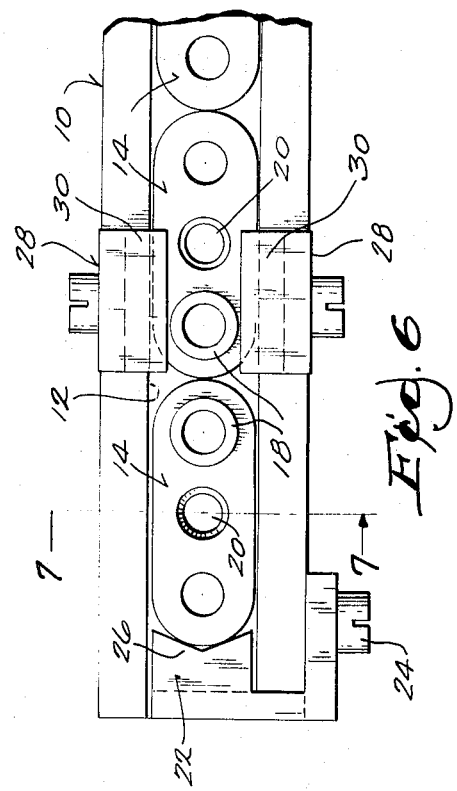
INVENTOR
EDWIN MILKERT
BY Wheeler, Wheeler + Wheeler
ATTORNEYS

# United States Patent Office 3,348,248
Patented Oct. 24, 1967

3,348,248
AUTOMATIC TAPPING MACHINE AND METHOD
Edwin Milkert, East St. Louis, Ill., assignor to MSL Industries, Inc., Racine, Wis., a corporation of Minnesota
Filed Nov. 1, 1965, Ser. No. 505,903
6 Claims. (Cl. 10—129)

This invention relates to an automatic tapping machine and method.

Workpieces are fed down a chute to an adjustable stop which will be designed to fit the particular workpiece and will be located at the extreme end of the chute. At right angles to the chute, and therefore in alignment with the workpiece, is a tapping assembly including a motor and bodily reciprocable to and from the work. Attached to the motor is the tapping tool and in the path of reciprocation of the motor as it is bodily moved by the ram are limit switches for controlling motor operation. Carried by the motor to partake of its bodily reciprocation is a yieldably mounted stripper and work holding plate having an opening through which the tapping tool may advance when the yieldable stripper plate engages the workpiece at the bottom of the chute.

When the tapping operation is complete, the limit switch reverses the direction of rotation of the tap and also retracts the motor and tap bodily away from the chute. The retraction occurs while the tap is still engaged with the workpiece and the workpiece is held by the tap against the stripper plate. Accordingly, the bodily retractive movement of the tapping assembly lifts the workpiece from the chute and carries it sufficiently far in the oblique direction of retraction so that when the tap becomes completely disengaged from the workpiece, the workpiece will fall clear of the chute.

Meantime, the removal of the workpiece from the bottom of the chute automatically permits the next successive workpiece to be advanced by gravity or otherwise into a position at the end of the chute to be engaged by the tap in the course of its next downward movement. Thus the inclination of the chute and the inclination of the path of movement of the tapping assembly at right angles thereto not only permits gravity feed of successive workpieces down the chute but also results in the withdrawal of successive workpieces and their discharge free of the chute. The loading and unloading operations as heretofore performed by hand are both performed automatically in the present device as incidents of the automatic functioning of the tap and without requiring any additional parts or manual control.

In the drawings:

FIG. 1 is a view in side elevation of the apparatus embodying the invention.

FIG. 2 is a fragmentary detail view in elevation from the viewpoint indicated at 2—2 in FIG. 1.

FIG. 3 is an enlarged detail view in bottom perspective of the stripper plate with which the tapping apparatus is provided for the purposes of this invention.

FIG. 4 is a view in side elevation of a typical workpiece.

FIG. 5 is a plan view of the workpiece.

FIG. 6 is a fragmentary detail view of the chute from the viewpoint indicated at 6—6 in FIG. 1.

FIG. 7 is a detail view in transverse section taken on the line 7—7 of FIG. 6.

Suitable supporting means 8 mounts the chute 10 at an angle which happens to be approximately 35°. The angle may be varied according to what is appropriate for the particular work. The chute 10 is provided in its bottom with a channel 12 for the workpieces which are to be tapped. Obviously, the workpieces will vary according to requirements. However, in order to exemplify the invention, I have shown a workpiece 14 which has rounded ends 16 and an upstanding boss 18 near one of its ends. The opening 20 which is to be tapped is in the center.

A stop 22 is adjustably held by screw 24 to the extreme lower end of the chute 10. It has been found convenient in handling this particular workpiece to provide a notched arm 26 extending upwardly along the chute. The rounded end of the workpiece is received and centered and supported in the stop surfaces which form the notch.

As best shown in FIG. 7, it is preferred to provide holddown devices 28, which have fingers 30 which overhang the workpieces approaching tapping position. These fingers are so spaced that the boss 18 passes between them as shown in FIG. 7.

A support 34 of any appropriate construction carries a ram or equivalent device 36 for advancing and retracting bodily a tapping assembly comprising tap motor 38 and the tap 40 mounted and driven thereby. The tapping apparatus is generally conventional and will not be described in detail. Attached thereto by means of an adapter plate 42 (FIG. 2) are the shoulder screws 44 upon which a stripper plate 46 is slideably mounted. The stripper plate is separately illustrated in inverted perspective in FIG. 3 and has counterbores 48 which receive the heads of the shoulder screws 44. The plate is biased downwardly on the shoulder screws into engagement with their heads by means of compression springs 50 which encircle the shoulder screws.

The plate 46 is not merely a stripper plate. It has work-engaging portions which hold the work against rotation, this being particularly important during retractive movement of the tapping apparatus as will hereinafter be apparent. The boss 52 integrally formed on the lower face of the stripper plate 46 has a transverse channel at 54 with side surfaces 56 which laterally engage respective workpieces against which the plate is pushed in the descent of the tapping assembly. There is a central opening at 58 through which the tap 40 extends and retracts and there are recesses at 60 at both ends of the channel 54. One of these recesses will receive the boss 18 on the particular workpiece 14 which has been selected to exemplify the use of the invention. Since there are two recesses 60, it is unnecessary to orient the workpiece. No matter which end of the workpiece is in the lead as the workpiece descends the chute, one of the recesses 60 will receive the boss.

Advancing and retracting movement and forward and reverse operation of the tapping mechanism is controlled automatically, as by limit switches 64 and 66 between which projects a switch operating disk 68 carried by the tapping mechanism. The desired operation will be described but it is deemed unnecessary to show the circuits since they will be easily within the capacity of any electrician when the desired objectives are known. The locations of the limit switches are merely diagrammatic. In practice, they are located at the front or top side of the equipment.

In operation, the engagement of disk 68 with limit switch 64 energizes the ram 36 to advance the tapping mechanism bodily downwardly and to initiate forward rotation of the tap 40 for operation to provide threads in the opening 20 of the workpiece 14 which is in tapping position at the bottom of the chute.

Before the tapping mechanism reaches its extreme position, as defined by engagement of disk 68 with limit switch 66, the stripper plate will engage the workpiece and the workpiece will become confined in the channel 54 of the boss 52. With the boss in clamping engagement with the work, the plate will yield along the guide screws 44 against the bias of springs 50 as the tap 40 continues to advance through opening 58 of the boss for active operation on the workpiece.

When the tap has performed its operation, the disk 68 engages limit switch 66, thereby closing a circuit to bring about retraction of the tapping mechanism and reversal of direction of rotation of the tap. Since the workpiece is held against rotation by engagement between the lateral surfaces 56 of channel 54, the tap will unscrew itself from the workpiece. Meantime, the workpiece will be lifted from the chute and will be replaced by another workpiece delivered by gravity down the chute 10.

By the time the tap has completely unscrewed itself from the workpiece, the oblique direction of withdrawal of the workpiece from the tap will have moved the workpiece beyond the end of the chute. When the workpiece then falls free of the tap, it clears the chute 10 and drops into a side delivery trough 70 leading to a suitable container.

The operation is continuous inasmuch as one of the limit switches is contacted at the extreme of each direction of movement of the tapping apparatus to reverse the direction of bodily movement and the direction of rotation of the tap.

A fixed rod 72 (FIG. 1) guides the tapping assembly 38 as it reciprocates and also acts as a positive downward stop by providing adjustable stop nuts 74.

Irrespective of the particular mechanism herein disclosed by way of exemplification, the invention is believed to include a new method of operation concerned with the oblique gravity feed of workpieces and the movement of the tapping mechanism which is at right angles to a given workpiece but has the effect of withdrawing the workpiece and dropping it into a receiver at the conclusion of the tapping operation.

No means has been disclosed for placing the workpieces in the chute 10. This may be done manually but it is contemplated that it be done mechanically through known vibratory hopper feeding equipment (not shown).

I claim:

1. A method of moving workpieces to and from a tapping station, such method including the bias and advance of successive workpieces toward such station, the stopping of an advanced workpiece at said station, the engagement of a tap with a workpiece stopped at said station to form threads, the bodily withdrawal of the tap from said station while still engaged with the workpiece whereby to lift the workpiece from the station and permit the advance of a successive workpiece to the station, and the unscrewing of the tap from the workpiece following its bodily removal from said station and the discharge of the workpiece free of said station.

2. A method of moving workpieces to and from a tapping station, such method consisting in the steps of advancing a succession of workpieces under bias toward said station, stopping the most advanced workpiece at said station, advancing a tap at right angles to the direction of advance of the workpiece and engaging the tap with the workpiece at said station to form threads therein with which the tap is in engagement, the bodily retraction of the tap from said station carrying with it the workpiece with which it is still engaged, and simultaneously rotating the tap in a direction to disengage it from the threads formed on the workpiece and holding the workpiece against rotation in said direction, whereby to drop the workpiece free of said station.

3. Apparatus of the character described comprising the combination with an inclined chute for gravity delivery of a succession of workpieces, means defining a tapping station and comprising a stop engaged by the foremost workpiece in the chute, tapping equipment having means mounting it for movement obliquely to the vertical and for movement toward and from the position of a workpiece in said station with the tap substantially normal to the workpiece, a stripper plate having means for laterally engaging a workpiece at said station for holding it against rotation and for clamping it during engagement of the tap with the workpiece, said stripper plate being yieldably mounted on said tapping mechanism for movement therewith to and from the station, and means for causing the advance and retraction of the tapping mechanism to and from the station and for unscrewing the tap from the workpiece in the course of such retraction, the engagement of the tap with the workpiece prior to its disengagement therefrom serving to lift the workpiece from the chute to accommodate movement of a successive workpiece against the stop at said station, the workpiece so lifted being dropped free of the chute when the tap is unscrewed therefrom.

4. Apparatus of the character described comprising the combination with a feed chute having a channel for workpieces and a support holding said chute at an angle for gravity-biasing the workpieces for movement toward one end of the chute, a stop defining a tapping station at said end of the chute, tapping equipment having a support upon which such equipment is bodily movable in a direction which is substantially normal to the chute and oblique with reference to the vertical, said equipment including a motor and a motor driven tap for operating on a workpiece engaged with said stop, guides projecting substantially parallel to the tap and connected with said equipment, a stripper plate having an opening for the tap and having portions mounted on said guides for reciprocation axially of the tap, spring means biasing the stripper plate to a position which is normally beyond the end of the tap, said stripper plate being yieldable from said position against the bias of said spring means for engaging a workpiece for holding it against rotation, and means for causing the advance and retraction of the tapping mechanism bodily toward and away from the position of the workpiece at the end of such chute, said tapping equipment including motor means for the rotation of the tap in a tapping direction of screwthreaded engagement with the workpiece and in a withdrawal direction in which it is unscrewed from the workpiece in the course of bodily retraction of the tapping mechanism away from the chute, such retraction occurring while the tap is still in screwthreaded engagement with the workpiece, whereby the workpiece is lifted from the chute to permit gravity bias delivery of another workpiece into engagement with said stop, the continued unscrewing of the tap from the workpiece so lifted being ultimately adapted to release said lifted workpiece, which, due to the oblique direction of withdrawal of the tapping mechanism is permitted to drop free of the chute.

5. Apparatus according to claim 4 in which the chute has adjustable hold-down means spaced upwardly of the inclined chute from the stop.

6. Apparatus according to claim 4 in which the stop is adjustably connected with the chute and comprises a notched arm projecting upwardly along the chute.

References Cited

UNITED STATES PATENTS 695,760   3/1902   Nolan _____ 10—165 X

FOREIGN PATENTS 1,100,005   3/1955   France.

FRANCIS S. HUSAR, *Primary Examiner.*